Jan. 15, 1963  J. B. BEAMAN ETAL  3,073,101
LAWN EDGER
Filed Sept. 23, 1959

INVENTORS
JOHN B. BEAMAN
BY VIVIAN L. OTT

ATTORNEYS

3,073,101
LAWN EDGER
John B. Beaman, 815 Church St., Ahoskie, N.C., and Vivian L. Ott, 6100 Sylvan Ave., Norfolk 8, Va.
Filed Sept. 23, 1959, Ser. No. 841,747
7 Claims. (Cl. 56—249)

This invention relates to garden accessories and pertains, more particularly, to a device for edging or trimming the edge of a lawn, such as adjacent a walkway or the like.

Of primary concern in connection with the present invention is the provision of a lawn edging means which embodies a single wheel having an integrally formed gear and hub upon which a rubber tire is mounted, with the gear rotating with the tire and cooperating with a pinion carried by a shaft journalled in a collar which also serves to mount a blade member adapted for disposition close to the ground surface and cooperable with a reel member to effect an edging action.

Another object of this invention resides in the provision of a mechanism substantially as described in the preceding paragraph wherein the collar member has a shaft projecting laterally therefrom which serves as an axle shaft for the wheel, extending centrally through the integrally formed gear and hub and which shaft also serves as a mounting means for the handle member through the medium of which the mechanism is propelled.

Still another object of this invention resides in the novel arrangement of component parts in a lawn edger including the wheel mechanism, the handle mechanism associated with the wheel and the cutting mechanism mounted in conjunction with both the wheel and the handle and the interrelationship therebetween which effects a simple, yet highly effective, edging device and one which is of economical construction.

A further object of this invention resides in the provision of a lawn edging mechanism which includes a drive shaft having a reel or sweeping blade thereon cooperable with a generally horizontally disposed cutting blade in which the cutting blade is adjustable to various angular positions circumferentially with respect to the sweeping blade to effect a variation in the height of the cutting plane.

Still another object of this invention resides in the provision of a lawn edging mechanism which includes a single wheel having a gear rigid therewith and wherein the wheel is provided with an axle shaft associated with a handle for propelling the device and wherein a cutting mechanism is mounted on the axle shaft along side of the wheel and projecting in part forwardly therefrom, the cutting mechanism and wheel being relatively rotatable with respect to each other, and with there being an abutment means on the cutting mechanism engageable with the handle to constrain the position of the cutting mechanism relative to the handle and to maintain the same in a generally horizontal attitude.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

Figure 4:
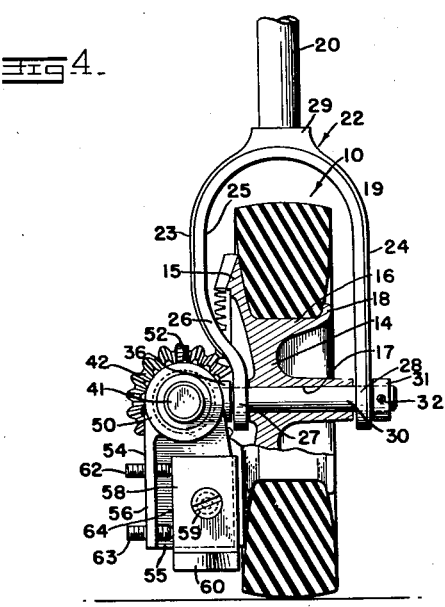
Figure 3:
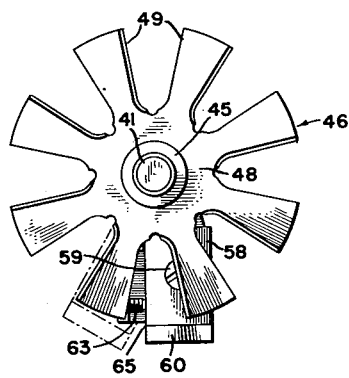

FIG. 3 is a front elevational view of the cutting mechanism showing, in full and dotted lines, two of the infinite adjusted positions which the cutter blade may assume; and FIG. 4 is a front elevational view of the edging mechanism, with portions of the wheel sectioned and broken away to show the relative disposition of the various component parts and illustrating the integral gear hub and rim assembly for mounting the rubber tire.

Figure 1:
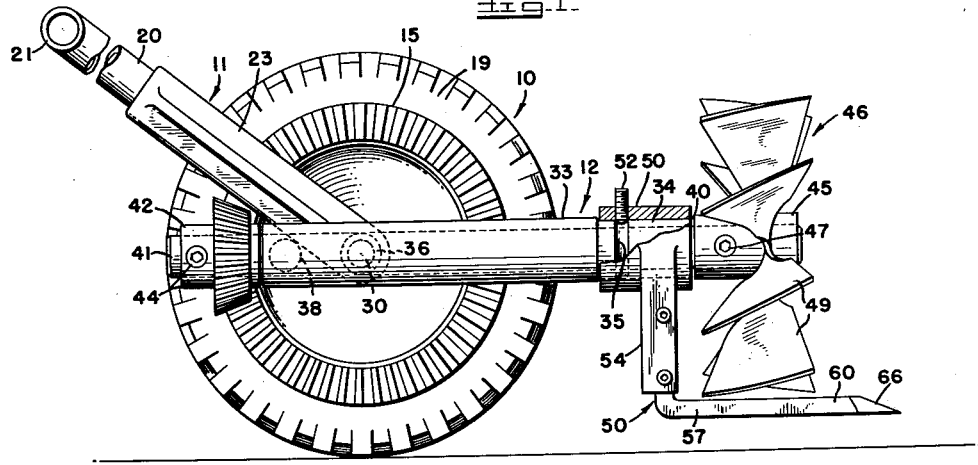
FIG. 1 is a side elevational view of a lawn edger constructed in accordance with this invention, with portions thereof being broken away to show details of construction.

Referring at this time more particularly to FIG. 1, there is shown therein an edging mechanism constructed in accordance with this invention, which consists essentially of the wheel assembly indicated generally by the reference character 10, the handle assembly indicated generally by the reference character 11 and the cutting assembly indicated generally by the reference character 12. The wheel assembly 10 includes an integral hub 14, gear 15 and rim 16 preferably formed from a single casting and which mechanism is generally of a shape in crosssection substantially as shown in FIG. 4. The hub portion 14 is provided with a transverse bore 17 disposed centrally thereof and concentric with the gear 15 and the rim is formed with the back of the gear 15 as one side thereof and with a circumferentially extending flange 18 as the opposite side thereof, and which rim forms a mounting means for the rubber tire 19 substantially as is shown in FIG. 4, and by means of which the tire is held properly in place on the integral assembly.

Figure 2:
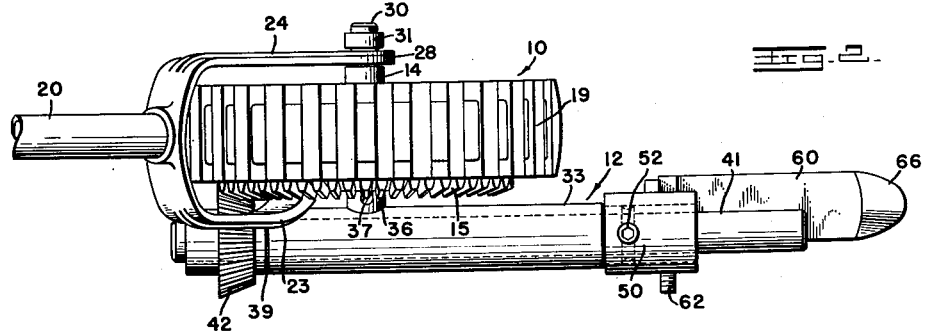
FIG. 2 is a top plan view of the assembly shown in FIG. 1, with the sweeping blade removed to illustrate details of the cutting blade mechanism.

The handle includes an elongate portion 20 which may be provided at its extremity with a transverse hand grip portion 21, see particularly FIG. 1, and the lower end of the portion 20 is provided with a fork assembly indicated generally by the reference character 22. The fork assembly is provided with a pair of arms 23 and 24 which straddle the wheel assembly 10 in the manner shown most clearly in FIGS. 2 and 4. The arm 23 includes a relatively straight portion 25 and its lower extremity is inwardly arcuated or offset as indicated by the reference character 26 and terminates in an end portion 27 lying generally parallel to the corresponding end portion 28 of the other arm 24. The arm 24 is substantially straight as shown, except at its upper extremity where it is joined to the arm 23 and the ferrule portion 29 of the fork in that portion which arches over the wheel assembly 10.

The two end portions 27 and 28 of the arms 23 and 24 are apertured and rotatably receive therewithin opposite end portions of an axle shaft 30 which extends through and is journalled within the transverse bore 17 of the hub assembly 14. The axle shaft 30 is rigid with the cutter mechanism 12 as hereinafter set forth more fully, and it carries at its free end portion a stop collar 31 which is affixed to the axle shaft by means of a set screw 32 or the like and which collar serves to laterally or axially position the axle shaft 30 with respect to the wheel.

The cutter assembly 12 includes an elongate bearing tube 33 having a reduced end portion 34 provided with a circumferential groove 35 therewithin, see particularly FIG. 1. Adjacent the opposite end of the tube 33 is a laterally projecting boss 36 which is recessed to receive an end of the axle shaft 30 and this boss is provided with a set screw 37, see particularly FIG. 2, by means of which the axle shaft 30 is rigidly secured to the tube member. Disposed in spaced relationship with and behind the boss 36 is a lateral stop member or projection 38, shown in dotted lines in FIG. 1. The purpose of this stop member will be presently apparent.

The rear end face of the tube 33 is indicated by the reference character 39 and the forward end face of the tube is indicated by the reference character 40. Projecting completely through the tube 33 and beyond the rear and forward faces 39 and 40 thereof is a drive shaft 41. The rear extremity of the drive shaft receives thereon a pinion gear 42 which meshes with the bevel gear 15 and which pinion gear includes a hub portion provided with a set screw 44, by means of which the pinion gear is rigid with the drive shaft 41. The forward extremity of the drive shaft receives the hub 45 of a sweep blade assembly indicated generally by the reference character 46. The hub 45 is provided with a set screw 47 rigidly affixed to the drive shaft so that as the same is rotated through the pinion gear 42, the sweep blade assembly 46 will likewise rotate.

Preferably, the blade assembly, exclusive of the hub 45, is formed from a single sheet stamping with a substantially coplanar central portion 48 and with twisted radially extending and circumferentially spaced blades 49 having outer end cutting edges, see particularly FIG. 3. The central portion 48 is provided with a concentric opening receiving the hub 45 to which the stamping is rigidly affixed.

The cutter blade assembly is indicated generally by the reference character 50 and includes a collar 51 which is snugly but rotatably fitted on the reduced end portion 34 of tube 33. This collar carries a set screw 52 which is engageable within the circumferential groove 35 previously mentioned, and by means of which the collar can be rotated to any desired angular position relative to the tube as will be readily apparent. The collar is provided with a radially downwardly projecting arm 54 which is in the form of a relatively wide plate portion 55 having along one edge thereof a forwardly projecting lateral flange 56. An L-shaped cutter blade 57 is secured to the arm 54, the substantially vertical portion 58 thereof being abutted in face-to-face contact with the forward face of the arm portion 55 and secured thereto by a single screw threaded pivot member 59 so that the horizontal portion 60 of the cutter blade projects substantially horizontally in parallelism with the axis of the drive shaft 41. The flange 56 carries a pair of adjustment set screws 62 and 63 which extend inwardly thereof into abutting relationship with the side edge 64 of the vertical portion 58 of the cutter blade. By adjusting the set screws 62 and 63, the cutter blade 60 may be adjusted relative to the sweep blade 46 so as to achieve the proper cutting angle of the blade cutting edge with relation thereto, see particularly FIG. 3, it being appreciated in this figure that the rotation of the sweep blade 46 is counterclockwise so that the edge 65 of the cutter blade is that edge which actually performs the cutting operation.

In operation, the cutter blade is disposed so that the bottom or sole of the horizontal portion 60 thereof lies in a substantially horizontal plane, it being appreciated that due to the fact that there is only one wheel, the device can be manipulated very close to a wall, for example, or to a walkway so as to trim along the edge of the obstacle and, therefore, effect an edging action. The tip end of the blade in its horizontal portion is tapered as indicated by the reference character 66 so as to pick up any blades of grass which may be lying flat or in an angulated position which would otherwise be difficult to cut. The sweep blades, of course, impinge these blades of grass against the cutting edge 65 and sever them at whatever height the edge 65 is above the ground surface. To vary the height of the cutting edge 65, it is merely necessary to loosen the set screw 52 and rotate the collar 50 until the desired height of the cutting edge is reached. It is to be noted that the tube 33 and, indeed the entire cutting assembly 12 is relatively supported only by the axle shaft 30 in relation to the handle and the wheel and were it not for the abutment 38 which engages the lower edge of the arm 23 of the handle fork, the proper horizontal attitude of the tube 33 and, consequently, the cutter blade 57 would not be affected and it is for this purpose that the projection or stop member 38 is provided, it being understood that it projects laterally from the tube 33 a sufficient distance to engage the lower edge of the above mentioned arm 23.

It will be further noted that the assemblage is extremely simple in design, yet it is highly effective for the purposes intended. For example, the particular configuration of the handle fork cooperates with the relative disposition of the integral assembly, including the gear 15 and the cutter mechanism 12 and permits a very compact assemblage.

We claim:

1. A lawn edger comprising in a unitary casting a hub member formed with a rim, a flange on one side of the rim and on the other side thereof with a bevel gear, a rubber tire mounted on said rim between said flange and gear, an axle shaft rotatably extending through said hub concentrically of said tire and bevel gear and having its opposite ends projecting beyond the corresponding opposite ends of the hub, a handle assembly including a bifurcated fork presenting a pair of arms having their free ends rotatably receiving the opposite ends of said axle shaft, a cutter assembly including a generally horizontally disposed elongated tube, said axle shaft being rigidly fixed to said tube in laterally projecting relationship thereto such that the tube projects across the side of said bevel gear and forwardly of the tire, a drive shaft rotatably journalled in said tube and having at one end thereof a pinion meshed with said bevel gear such that the drive shaft is rotated in response to rotation of the tire and gear, and edging means carried by the forward end of the cutter assembly.

2. A lawn edger comprising a wheel assembly, a handle assembly and a cutter assembly including fully rotating sweep blades, the aforementioned assemblies being joined together by a common axle shaft and being relatively articulated, drive means interconnecting said wheel assembly and said cutter assembly for operation of the latter as the wheel assembly is rotated, the cutter assembly further including a straight cutting blade having a cutter edge perpendicular to the turning axis of the wheel assembly and disposed on a generally horizontal plane and being angularly rotatable to an adjusted position to vary the height of said cutting edge from the ground surface.

3. A lawn edger comprising a wheel assembly, a handle assembly and a cutter assembly including rotating sweep blades and a stationary cutter blade, the aforementioned assemblies being joined together by a common axle shaft and being relatively articulated, drive means interconnecting said wheel assembly and said cutter assembly for effecting cooperative operation of the sweep blades and cutter blade as the wheel assembly is rotated, the cutter a cutter blade having a straight cutting edge parallel with the rotary axis of the sweep blades and disposed in a generally horizontal plane and being angularly rotatable to a desired adjusted position to vary the height of said cutting edge from the ground surface, the sweep blades rotating in a plane generally perpendicular to said cutting edge and the blades having radially directed cutting edges sweeping in close adjacency to said cutting edge.

4. A lawn edger comprising a wheel including a hub, an axle extending through the hub, a bevel gear concentric with and fixed to one side of the hub, a bearing tube disposed diametrically across and adjacent to the gear and having the adjacent end of the axle secured thereto, said bearing tube having a forward end portion of reduced outside circumference and forming an external bearing surface, a shaft extending through and projecting beyond both the forward and rear ends of the bearing tube, a pinion gear secured to the projecting rear end of the shaft and meshing with the bevel gear, a cutter blade assembly comprising a collar encircling and rotatable on said external bearing surface, an arm carried by said collar and depending therefrom, a cutter blade having a right angularly extending portion positioned uprightly against and secured to said arm so that the blade extends forwardly from the arm, the blade having a straight cutting edge parallel with the axis of said shaft, a circular assembly of sweep blades secured to and radiating from the forward end of the shaft to be turned thereby in a sweeping circular path of movement of their outer ends across said cutting edge, said collar upon rotation on the bearing surface adjustably moving said cutter blade in a path parallel with the circular path of movement of the outer ends of the sweep blades whereby the height of said cutting edge above the ground surface may be varied, means for securing the collar in a rotated position of adjustment, and a handle assembly supported on said axle.

5. The invention according to claim 4, wherein the last stated means comprises a set screw threaded through the collar and a groove formed in a circumferential direction in said bearing surface and into which the inner end of the set screw projects and against the bottom of which the end of the set screw bears.

6. The invention according to claim 4, with another means for adjustably moving said blade in an arcuate path about a center eccentric to the center of rotation of the collar.

7. The invention according to claim 4, wherein said arm is in the form of a plate having a forwardly directed face against which said portion of the blade engages, a flange on said plate face at one side of said blade portion, a pivot screw extending through said portion of the blade and providing means for adjustably moving the blade in another arcuate path, and screw means carried by said flange and engaging said blade portion to secure the blade against movement on the pivot screw.

References Cited in the file of this patent

UNITED STATES PATENTS

| | | |
|---|---|---|
| Re. 24,729 | Sturgis | Oct. 27, 1959 |
| 362,516 | Kenyon | May 10, 1887 |
| 1,127,764 | Huck | Feb. 9, 1915 |
| 2,093,413 | Brasted | Sept. 21, 1937 |
| 2,654,180 | Redfield | Oct. 6, 1953 |
| 2,782,587 | Ott | Feb. 26, 1957 |